(12) United States Patent
Zhou et al.

(10) Patent No.: US 6,498,630 B1
(45) Date of Patent: Dec. 24, 2002

(54) X-RAY PROTECTION CIRCUIT

(75) Inventors: Donglin Zhou, Shenzhen (CN); Yann Desprez-Le Goarant, Singapore (SG)

(73) Assignee: STMicroelectronics Asia Pacific PTE Ltd., Singapore (SG)

( * ) Notice: Subject to any disclaimer, the term of this patent is extended or adjusted under 35 U.S.C. 154(b) by 0 days.

(21) Appl. No.: 09/463,691
(22) PCT Filed: Jul. 21, 1997
(86) PCT No.: PCT/SG97/00030
§ 371 (c)(1), (2), (4) Date: Oct. 27, 2000
(87) PCT Pub. No.: WO99/04556
PCT Pub. Date: Jan. 28, 1999

(51) Int. Cl.[7] .................................................. H04N 5/65
(52) U.S. Cl. ........................ 348/819; 348/378; 315/411
(58) Field of Search ................................ 348/818, 819, 348/378; 315/364, 411; H04N 5/65

(56) References Cited

U.S. PATENT DOCUMENTS

| | | | | |
|---|---|---|---|---|
| 4,074,323 A | * | 2/1978 | Griffey | 348/378 |
| 4,656,399 A | * | 4/1987 | Testin et al. | 315/411 |
| 5,148,088 A | * | 9/1992 | Jernigan | 315/411 |
| 5,255,147 A | * | 10/1993 | Oh | 361/93 |
| 5,491,794 A | * | 2/1996 | Wu | 395/182.21 |
| 5,945,793 A | * | 8/1999 | Park et al. | 315/411 |

FOREIGN PATENT DOCUMENTS

| | | | |
|---|---|---|---|
| GB | 2274377 | * | 7/1994 |
| JP | 58080972 (Abstract) | * | 5/1983 |
| JP | 06303445 (Abstract) | * | 10/1994 |

OTHER PUBLICATIONS

IBM Technical Disclosure Bulletin, Nov. 1989, vol. No. 32, Issue No. 6B; p. 217–218, Figures 1–2; "Set/Reset System With Slow Set and Fast Reset".*

* cited by examiner

*Primary Examiner*—John Miller
*Assistant Examiner*—Brian Yenke
(74) *Attorney, Agent, or Firm*—Lisa K. Jorgenson; David V. Carlson; Seed IP Law Group PLLC

(57) ABSTRACT

An x-ray protection circuit for a video processor, to disable a horizontal output pulse when a voltage level on the x-ray input exceeds a reference voltage. The x-ray protection circuit comprises a comparator and a bistable device, and incorporates a reset circuit. The reset circuit enables the initialisation of the protection circuit whilst the power is switched on.

20 Claims, 5 Drawing Sheets

Power-On Reset Circuit

X-RAY PROTECTION CIRCUIT

FIELD OF THE INVENTION

The present invention relates to an x-ray protection circuit for a video processor to prevent excessive voltages on the EHT (extra high tension) of the rube of a television set.

In particular, the present invention relates to an improved protection circuit which utilises a "power-on-reset" circuit, to ensure that the x-ray output would not be held in the wrong state unable to automatically correct itself. Such a circuit enables automatic correction without the requirement of having to switch the power off and then on again, on the television set.

DESCRIPTION OF THE PRIOR ART

X-ray protection circuits are used in video processors to prevent excessive voltage on the EHT (extra high tension) of the rube of a television set. They detect the line flyback amplitude, and disable the horizontal output pulse when the amplitude of the flyback exceeds a certain limit.

A prior art protection circuit is shown in FIG. 1.

The circuit of FIG. 1 comprises a band gap comparator 1, which has a reference voltage input typically 1.3V, and, an x-ray input. When the x-ray input exceeds the (typically 1.3V) threshold, this triggers an analog d-latch (thyristor structure) 2 such that its output (the x-ray output) will be high. The analog d-latch will memorise the x-ray detection, and will do so until the supply voltage $V_{cc}$ is reduced to below a predetermined value, typically 3V.

A problem with such prior art circuits is that the analog d-latch (thyristor structure) is easily triggered by parasitic spikes generated by the ESD (electrostatic discharge). This results in such protection circuit being held in the wrong state, and it is not able to automatically correct itself. To correct this occurrence the television is required to be switched off and then on again, such that the analog d-latch is reset.

In addition to the aforementioned prior art, the following documents describe x-ray protection circuits.

GB 2 274 377 describes a circuit which aims to filter the x-ray triggering obtained by the normal comparator input. This is done by counting (54) a certain number of trigger signals within a certain time interval before shutting down the horizontal deflection (through Qb). The RESET (56) of the counting operation is done if a certain number of pulses have not been counted, within a certain time interval. It requires a micro controller (4) for the operation, and the micro controller can be affected by ESD discharges. It also does mention ESD problems which can appear at any mode, such as Supply ground or substrate. ESD can lead to multiple parasites, which would still trigger the x-ray protection in this case.

U.S. Pat No. 4,074,323 describes a circuit including a thyristor (10) triggered by a voltage source derived from the winding (5c) of the flyback transformer (5). The filtering of the wrong signals is done with a RC circuit (20) & (21). The reset (23) is a (manual) switch activated after repair (page 4, lines 6–9). The memory system (10) is here a thyristor (external component). It also does nor mention ESD problems which can appear at any node, such as Supply ground or substrate.

SUMMARY OF THE INVENTION

The present invention seeks to provide an x-ray protection circuit for a video processor, which overcome the disadvantages of the prior art.

The present invention also seeks to provide an x-ray protection circuit for a video processor which ensures that the x-ray output is provided in a safe-state.

The present invention also seeks to provide a device which resets the protection circuit when an input exceeds a reference voltage or when a parasitic spike is detected on a supply voltage ($V_{cc}$), on ground or on a substrate.

In one broad form, the present invention provides an x-ray protection circuit to disable a horizontal output pulse of a video processor, characterised in that said protection circuit includes a reset circuit (5) to initialise said protection circuit whilst power of said video processor is switched on, and when a voltage level on the x-ray input exceeds a reference voltage or when a parasitic spike is detected on a supply voltage ($V_{cc}$), on ground or on a substrate.

Also preferably, the x-ray protection circuit further includes:
  a comparator (6), to provide a comparator output signal when an x-ray input voltage exceeds a reference voltage; and
  a bistable device (4), to receive said reset signal and said comparator output signal, and provide a memorised x-ray output signal to disable the horizontal output pulse when a voltage level on the x-ray input exceeds a reference voltage or a parasitic spike is detected on the supply voltage ($V_{cc}$), on ground or on substrate.

Preferably, said comparator is a bandgap comparator.
Also preferably, said reference voltage is about 1.3V.
In preferred forms, said bistable device is an analog or digital memory circuit with two stable states.
Preferably, said bistable circuit is a flip-flop.
Perhaps more preferably, said bistable circuit is an RS flip-flop.

In a preferred embodiment, said bistable circuit (4) gives priority to the reset (R), when set (S) and reset (R) are actived simultaneously due to a parasitic spike in supply voltage ($V_{cc}$), on ground or on a substrate.

In a most preferred form, said reset circuit is connected to the reset (R) input, said comparator is connected to the set (S) input, and said x-ray output is connected to the output Q of said RS flip-flop.

Also preferably, output QB of said RS flip-flop is connected to the BUS, the BUS being connected to the reset (R) input to additionally recover the x-ray if it is wrongly triggered by the parasitic spike.

In another preferred form, the present invention provides an x-ray protection circuit for a video processor including:
  a reset circuit (5), to detect the occurrence of a parasitic spike or a voltage level on the x-ray input of said video processor, on a supply voltage ($V_{cc}$), on ground or on a substrate, exceeding a reference voltage, and provide a reset signal in response thereto;
  a comparator (6), to provide a comparator output signal when a parasitic spike is detected or when an x-ray input voltage exceeds a reference voltage; and,
  a bistable circuit (4), to receive said reset signal and said comparator output signal and provide a memorised x-ray output signal to disable the horizontal output pulse when a parasitic spike has occurred or when a voltage level on the x-ray input, on a supply voltage ($V_{cc}$), on a ground or on a substrate, has exceeded a reference voltage.

Preferably, said bistable circuit gives priority to the reset (R), when set (S) and reset (R) are activated simultaneously.

Also preferably, said bistable circuit is a modified RS flip-flop.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF PREFERRED EMBODIMENTS

Throughout the drawings, like numerals will be used to identify similar features, except where expressly otherwise indicated.

Figure 1:
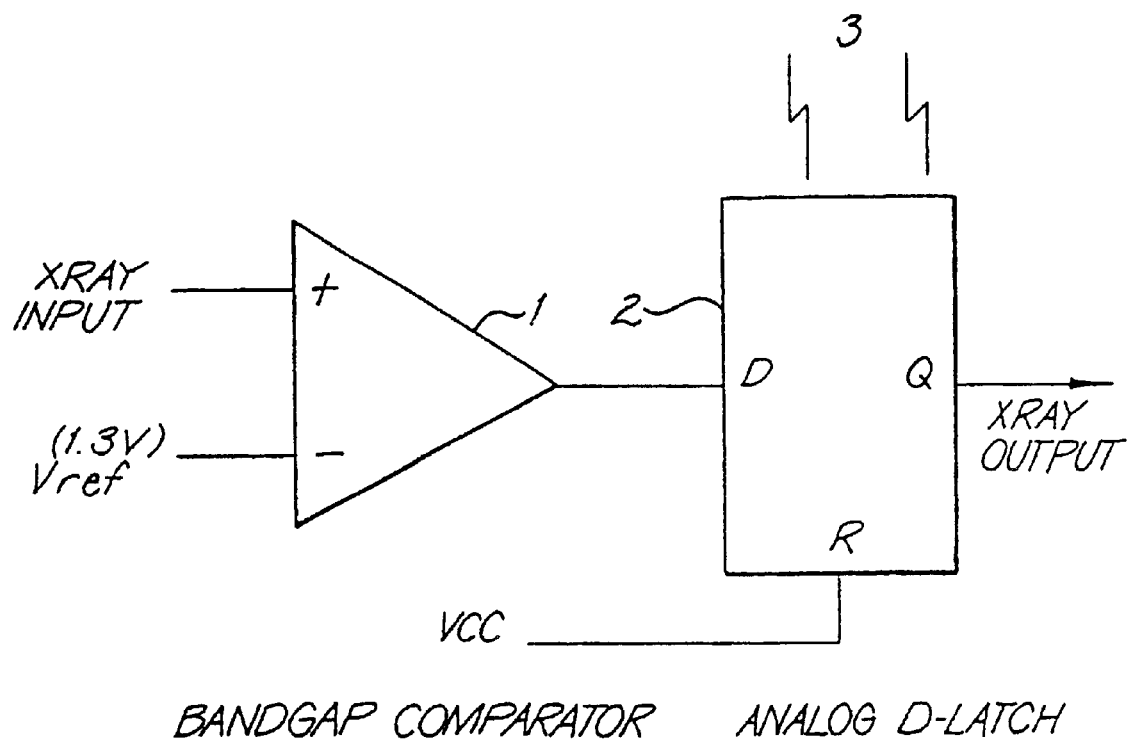
FIG. 1 illustrates a schematic diagram of a prior art x-ray protection circuit.

As hereinbefore described, a prior art protection circuit is illustrated in FIG. 1. A main disadvantage of such a prior art circuit is that the circuit can be held in the wrong state, unable to automatically correct itself. To correct the occurrence of a wrong state for such a prior art circuit, the television is required to be switched off and then on again, such that the analog d-latch is reset.

Figure 2:
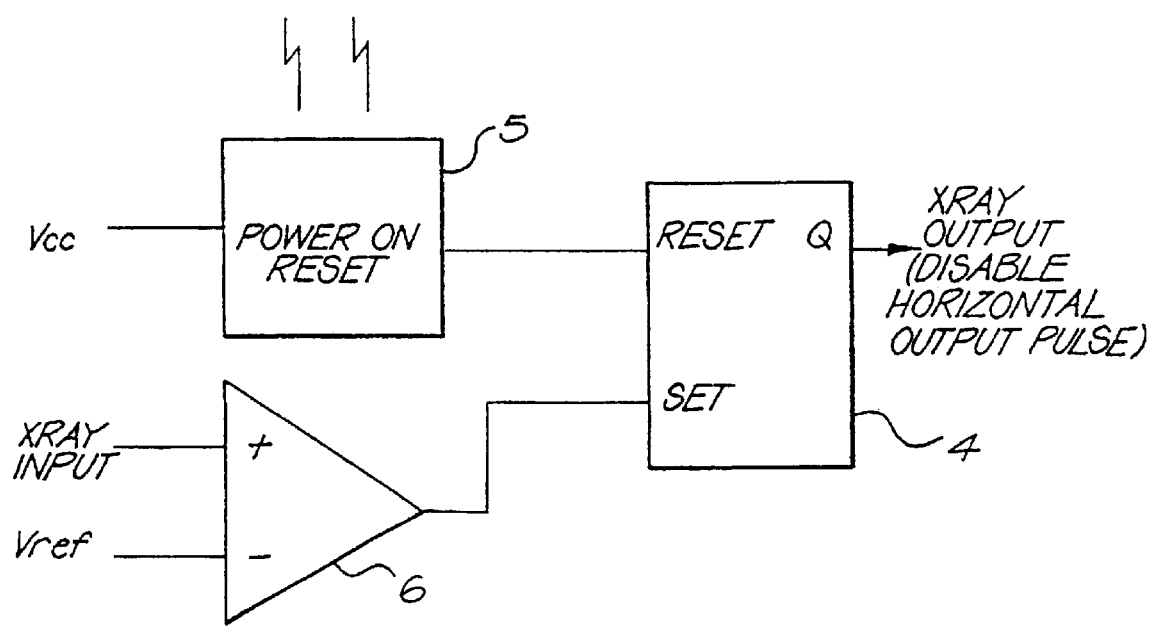
FIG. 2 illustrates a schematic diagram of a preferred embodiment of the present invention.

A preferred embodiment of the x-ray protection circuit in accordance with a preferred embodiment of the present invention is shown in FIG. 2. FIG. 2 illustrates that the x-ray protection circuit primarily comprises a bistable circuit 4, a reset circuit 5, and a comparator 6.

The bistable circuit 4 may be embodied as an RS flip-flop which has two stable output states. It should however be appreciated that other forms of bistable circuitry might be provided, and such circuit could be digital or analog. The x-ray output provides the signal to disable the horizontal output pulse of the video processor when a parasitic spike is detected. The inputs of the bistable circuit 4 are shown in FIG. 2 as the Reset (R) and Set (S) inputs.

The Reset (R) input is provided from the power-on-reset circuit 5 and enables the correct initialisation of the bistable circuit 4. This power-on-reset circuit 5 is therefore used to initialise the flip-flop or bistable circuit 4 when the power is switched on. This was the primary disadvantage of the prior art—the power had to previously be switched off and then on again. Since the power-on-reset circuit 5 is the weakest component to parasitic spikes, it may be used to reset the flip-flop 4 when a spike occurs.

However, if the x-ray input of comparator 6 is higher than prescribed reference voltage, which is typically 1.3V, the flip-flop 4 will be automatically set (and horizontal output pulse is disabled). It should therefore be appreciated that the circuit shown in FIG. 2 is a protection-circuit which is able to "correct" itself.

Figure 3:
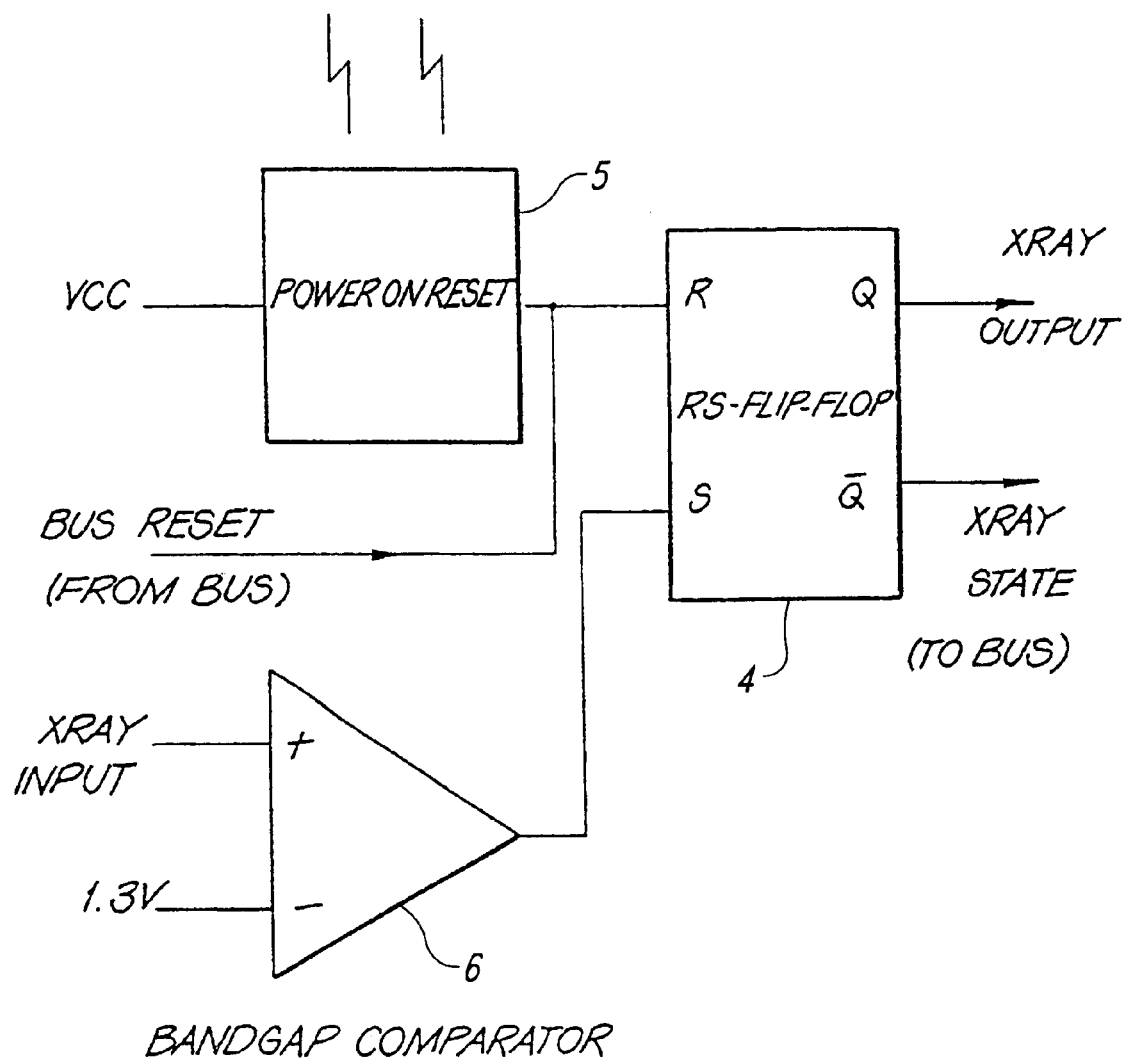
FIG. 3 illustrates a schematic diagram of a further preferred embodiment of the present invention.

A further embodiment of the invention is shown in FIG. 3. FIG. 3 shows a similar circuit to that of FIG. 2 but further includes bus connections. These two additional signal lines connected to bus, provide additional protection to recover the x-ray signal if it is wrongly triggered by the spike generated by the ESD (electrostatic discharge).

In operation, the circuitry works as follows. During the power ramping up, the power on reset circuit will reset the RS flip-flop, so that x-ray is in the untriggered state. When the voltage at the x-ray input exceeds the 1.3V threshold, the event will trigger the RS flip-flop and the x-ray will change into the triggered state. The RS flip-flop will memorise the x-ray detection. It can hold on until the supply voltage $V_{cc}$ is reduced to a certain voltage so that the power-on-reset circuit will generate a reset signal.

Figure 4:
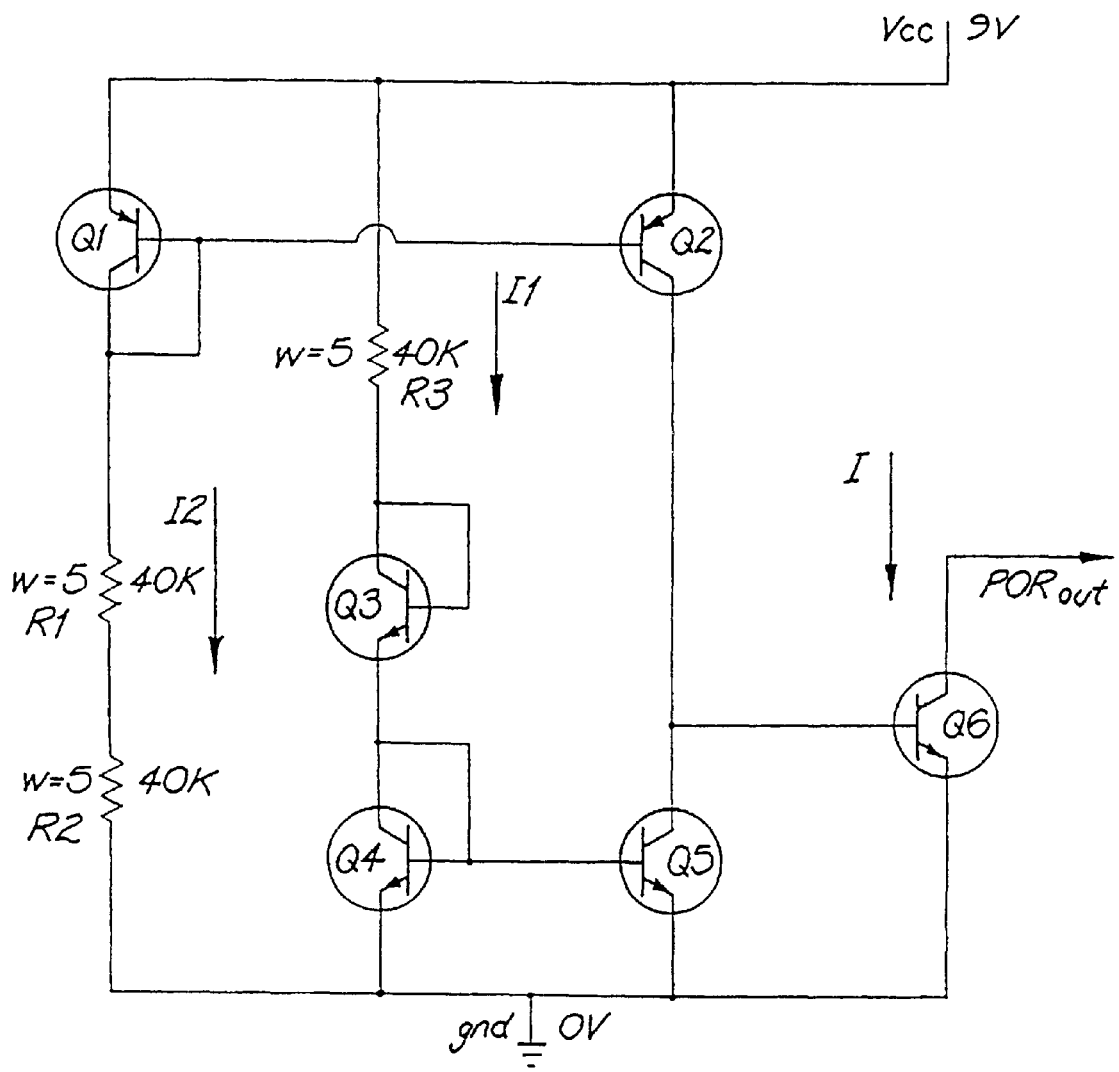
FIG. 4 details a preferred implementation of the reset circuit.

Referring to the power-on-reset circuit of FIG. 4

$$I_1=(V_{cc}-2Vbe)/R$$

$$I_2=(V_{cc}-Vbe)/2R$$

Therefore, 1) when $V_{cc}<=Vbe$, I=0
2) when $Vbe<V_{cc}<3Vbe$, I>0
3) when $V_{cc}>=3Vbe$, I=0

This power-on-reset circuit is different from the general power-on-reset circuit. After the power ramping up, the general power-on-reset circuit has some output current. In this circuit, since $V_{cc}>3Vbe$, there is not output current. The transistor Q6 is blocked (collector is high impedance). When a parasitic spike generated by the ESD occurs. Q6 is quite easy to trigger. This is proven by doing the simulation that during the spike of the supply voltage $V_{cc}$, ground and substrate, the circuit is easy to give a current spike at I output.

Figure 5:
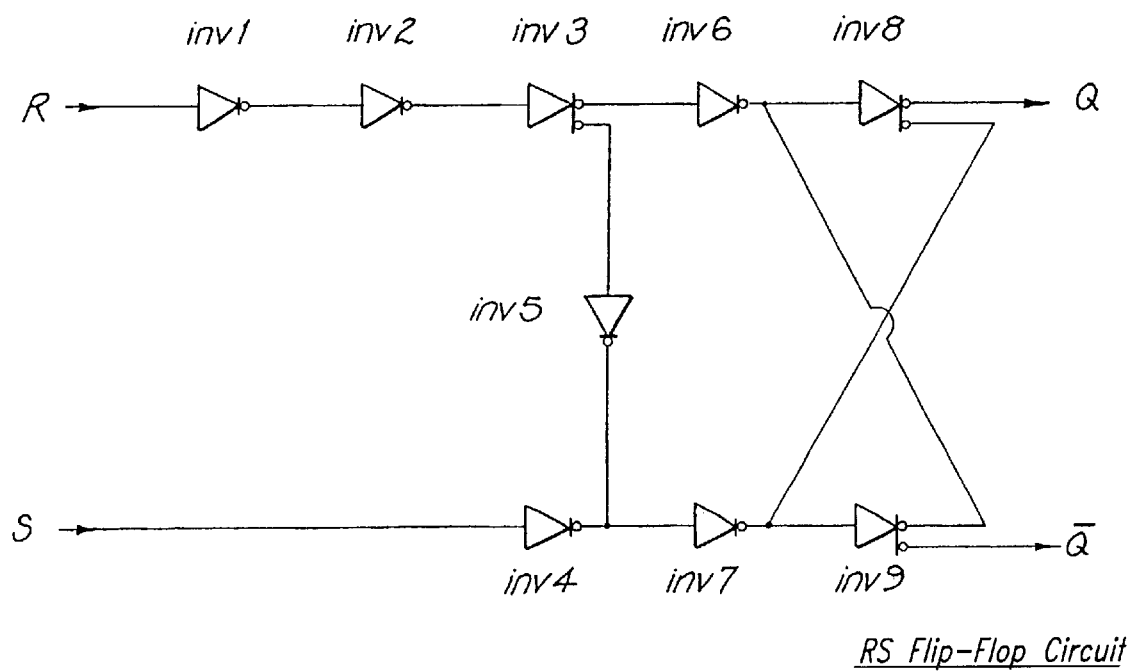
FIG. 5 illustrates a preferred implementation of the bistable circuit of the present invention.

The RS flip-flop circuit is as shown in FIG. 5. The RS flip-flop is different from ordinary RS flip-flop. The inverters inv1, inv2, and inv5 are the additional components compared to the ordinary RS flip-flop. If the circuit is triggered at the same time by both the R and S inputs, due to the inverter inv5, the result is Q=0 and QB=1, and since the R signal has two additional gates delay, after triggering, the circuit will remain in the untriggered state. Therefore, the S input will be inhibited if the R input and S input are triggered at the same time.

The x-ray has two states: the triggered state and the untriggered state. The triggered state is not a safe state for the x-ray since it can not correct itself if it is the wrong state. The untriggered state is a safe state for the x-ray since it will immediately change into the triggered state if it is the wrong state. So if the x-ray is in the untriggered state before the parasitic spike generated by the ESD, it should remain in the untriggered state after the parasitic spike generated by the ESD. If the x-ray is in the triggered state before the parasitic spike generated by the ESD, it can be either in the triggered or untriggered states since the untriggered state will be triggered immediately if the input voltage is still higher than 1.3V.

When a parasitic spike is generated by the ESD, since the power-on-reset circuit is triggered. the RS flip-flop will be reset and this will make the x-ray into the untriggered state whatever it is in the triggered or untriggered state before the parasitic spike generated by the ESD. Thus the x-ray circuit will be in the safe state. So this circuit can work with the parasitic spike generated by the ESD.

The circuit also has two additional signal lines connected with the bus. One is used to send the state of the RS flip-flop to the bus, another is used to reset the RS flip-flop with the reset signal from the bus. So the micro controller can control the x-ray through the bus. If the micro controller detects the x-ray is in the triggered state, it can send the reset signal to the x-ray and detect the new state of the x-ray. If the x-ray is still in the triggered state, this means that the last triggering is the correct triggering; otherwise the last triggering is the wrong triggering. In this way, even the x-ray is wrongly triggered by the parasitic spike generated by the ESD, the micro controller still can recover it. So this circuit can work with the parasitic spike generated by the ESD.

It will therefore be appreciated that the present invention provides a circuit which has one safe state, by using a power-on-reset circuit which is sensitive to the parasitic spike generated by the ESD (electrostatic discharge), and an RS flip-flop to ensure that the bi-state circuit is in the safe state after the parasitic spike is generated by the ESD (electrostatic discharge).

The circuit of the present invention has the advantage that, it can operate with the parasitic spike generated by the ESD with minimal additional cost. Furthermore, it can be integrated in the STV 2128 (video processor). Tests performed by the Applicant, indicate that this circuit provides far more accurate protection that conventional prior art protection circuits, such as illustrated in FIG. 1.

The differences between the prior art and the Applicant's invention enable the protection circuit to operate upon the detection of parasitic spikes on the power supply ($V_{cc}$), round and substrate, and not only on the normal comparator input. This is achieved by using a power-reset circuit and by using a modified RS flip-flop, which gives priority to the Reset, when Set and Reset are activated simultaneously.

It will be appreciated that variations and modifications to the present invention will become obvious to persons skilled in the art. All such variations and modifications should be considered to fall within the spirit and scope of the invention.

It will be also appreciated that other applications of the invention will become apparent to persons skilled in the art, whereby a bi-state circuit with one safe state is required. All such variations and modifications should be considered to be within the spirit and scope of the present invention as hereinbefore described and as hereinafter claimed.

The claims defining the present invention are as follows:

1. An x-ray protection circuit comprising:
   a reset circuit receiving a supply voltage, said reset circuit to detect an occurrence of a parasitic spike on the supply voltage, or on a ground, or on a substrate, and to generate a restore-maintain horizontal output pulse signal whilst power is on;
   a comparator to provide a comparator output signal when an x-ray input voltage exceeds a reference voltage; and
   a bistable device having a reset input coupled to receive said restore-maintain horizontal output pulse signal and a set input coupled to receive said comparator output signal, and provide a memorized x-ray output signal to disable a horizontal output pulse when the x-ray input voltage exceeds the reference voltage, wherein, when the parasitic spike is detected on the supply voltage, or on the ground, or on the substrate, the reset input of said bistable device is triggered, by said restore-maintain horizontal output pulse, to restore or maintain said horizontal output pulse, said bistable circuit giving priority to the reset input of said bistable device, when the set input and the reset input of said bistable device are activated substantially simultaneously.

2. The x-ray protection circuit as claimed in claim 1 wherein said comparator is a bandgap comparator.

3. The x-ray protection circuit as claimed in claim 1 wherein said reference voltage is about 1.3V.

4. The x-ray protection circuit as claimed in claim 1 wherein said bistable device is an analog or digital memory circuit with two stable states.

5. The x-ray protection circuit as claimed in claim 1 wherein said bistable circuit is a flip-flop.

6. The x-ray protection circuit as claimed in claim 1 wherein said bistable circuit is a modified RS flip-flop.

7. The x-ray protection circuit as claimed in claim 6 wherein said reset circuit is connected to the reset input, said comparator is connected to the set input, and said x-ray output signal is provided by an output of said modified RS flip-flop.

8. The x-ray protection circuit as claimed in claim 7 wherein an output of said modified RS flip-flop is connected to a BUS, said BUS being connected to the reset input to additionally recover the x-ray output signal to enable the horizontal output pulse, if said modified RS flip-flop is wrongly triggered by fie parasitic spike.

9. A self-correcting x-ray protection circuit, comprising:
   a power-on reset circuit receiving a supply voltage and responsive to a parasitic spike on the supply voltage, said power-on reset circuit for generating a restore-maintain horizontal output pulse signal;
   a comparator generating an output signal as a function of a comparison between a x-ray input signal and a reference voltage signal; and
   a bistable circuit coupled to receive the restore-maintain horizontal output pulse signal and the output signal generated by the comparator, said bistable circuit providing an x-ray output signal to enable a horizontal output pulse when the restore-maintain horizontal output pulse signal is activated substantially simultaneously with the output signal generated by the comparator.

10. The x-ray protection circuit of claim 9 wherein the output signal generated by the comparator comprises a disable horizontal output pulse signal.

11. The x-ray protection circuit of claim 10 wherein the bistable circuit is a modified RS flip-flop having a reset input and a set input, the modified RS flip-flop being coupled to receive the restore-maintain horizontal output pulse signal on the reset input, and being coupled to receive the disable horizontal output pulse signal on the set input.

12. The x-ray protection circuit of claim 10 wherein the output signal generated by the comparator is the disable horizontal output pulse signal if the x-ray input signal is greater than the reference voltage signal.

13. The x-ray protection circuit of claim 12 wherein the bistable circuit provides the x-ray output signal to enable the horizontal output pulse as a function of receiving the restore-maintain horizontal output pulse signal and provides the x-ray output signal to disable the horizontal output pulse as a function of receiving the disable horizontal output pulse signal generated by the comparator.

14. The x-ray protection circuit of claim 13 wherein the bistable circuit provides the x-ray output signal to enable the horizontal output pulse as a function of substantially simultaneously receiving the disable horizontal output pulse signal and the restore-maintain horizontal output pulse signal.

15. The x-ray protection circuit of claim 13 wherein the bistable circuit is a memory device having two stable states.

16. The x-ray protection circuit of claim 15 wherein the bistable circuit is a flip-flop.

17. A self-correcting x-ray protection circuit, comprising:
   a means for generating a restore-maintain horizontal output pulse signal as a function of detecting a parasitic spike on a supply voltage;
   a means for comparing an x-ray input signal to a reference voltage signal and responsively generating a disable horizontal output pulse signal;
   a means responsive to the restore-maintain horizontal output pulse signal for providing a x-ray output signal to enable a horizontal output pulse and responsive to the disable horizontal output pulse signal for providing the x-ray output signal to enable a horizontal output pulse, said means providing the x-ray output signal to enable a horizontal output pulse when the restore-maintain horizontal output pulse signal is activated substantially simultaneously with the disable horizontal output pulse signal.

18. The x-ray protection circuit of claim 17 wherein the means responsive to the restore-maintain horizontal output pulse signal and the disable horizontal output pulse signal is further responsive to simultaneously receiving the restore-maintain horizontal output pulse signal and the disable horizontal output pulse signal.

19. The x-ray protection circuit of claim 17 wherein the means responsive to the restore-maintain horizontal output pulse signal and the disable horizontal output pulse signal is a bistable memory means.

20. The x-ray protection circuit of claim 17 wherein the means for comparing includes a bandgap comparator.

* * * * *